United States Patent [19]

Hoppe et al.

[11] Patent Number: 5,011,874

[45] Date of Patent: Apr. 30, 1991

[54] CELLULOSE ESTER/POLYMER COMBINATIONS, AND THEIR PREPARATION AND USE

[75] Inventors: Lutz Hoppe, Walsrode; Wolfgang Koch; Erhard Lühmann, both of Bomlitz; Michael Piepho, Elze, all of Fed. Rep. of Germany

[73] Assignee: Wolff Walsrode Aktiengesellschaft, Walsrode, Fed. Rep. of Germany

[21] Appl. No.: 419,070

[22] Filed: Oct. 10, 1989

[30] Foreign Application Priority Data

Oct. 28, 1988 [DE] Fed. Rep. of Germany ....... 3836779

[51] Int. Cl.$^5$ .......................... C08L 1/00; C08L 1/14; C08G 63/48; C08C 63/91
[52] U.S. Cl. ........................................ 524/30; 524/37; 524/38; 524/39; 524/40; 524/733; 525/54.21; 525/54.23
[58] Field of Search ....................... 524/37, 38, 39, 40, 524/30, 733; 525/54.21, 54.23

[56] References Cited

U.S. PATENT DOCUMENTS

| | | | |
|---|---|---|---|
| 3,644,250 | 2/1972 | Ide et al. | 524/773 |
| 3,883,453 | 5/1975 | Takahashi et al. | 524/773 |
| 4,415,703 | 11/1983 | Toba et al. | 525/54.21 |
| 4,546,146 | 10/1985 | Kobashi et al. | 524/773 |

*Primary Examiner*—John Kight, III
*Assistant Examiner*—P. Hampton-Hightower
*Attorney, Agent, or Firm*—Sprung Horn Kramer & Woods

[57] ABSTRACT

Improved cellulose ester-polymer combinations contain a cellulose ester A and at least one polymerized monomer B of the following formula

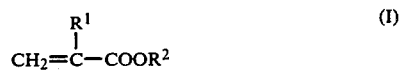

wherein the substituents have the meaning given in the description and wherein the particles of the combinations are essentially 0.1 to 10 mm in size.

12 Claims, No Drawings

CELLULOSE ESTER/POLYMER COMBINATIONS, AND THEIR PREPARATION AND USE

The invention relates to free-flowing cellulose ester-/polymer combinations, processes for their preparation and their use in lacquer binders, preferably based on isocyanate.

Incorporation of nitrocellulose into polyurethane lacquers is known. The course of the drying, the pigmentability and the gloss are generally thereby improved.

Since nitrocellulose in the dry state can easily be ignited by impact or friction, commercially available nitrocellulose must contain a moistening agent in an amount of at least 25 wt. % in order in this way to reduce the fire hazard during storage or handling and during transportation. Ethanol, isopropanol or n-butanol e.g. are used as such moistening agents.

When these nitrocelluloses are added to polyurethane lacquers, there is the problem that the moistening alcohol reacts with the isocyanate groups and the quality of the lacquer is reduced. Low molecular weight compounds which act as undesirable plasticizers in the lacquer film are formed.

Attempts have therefore been made to use inert solvents as moistening agents. According to DE-A-3 041 085, in this procedure nitrocellulose moistened with alcohol and/or water is dissolved in a solvent which dissolves the nitrocellulose or in an azeotropic mixture consisting of a solvent and a non-solvent. This nitrocellulose solution is then distilled so that the alcohol and-/or water is removed.

This process for the preparation of nitrocelluloses moistened with liquid hydrocarbon compounds, such as e.g. toluene or xylene, is difficult to handle and very cost-intensive for safety reasons, such as, e.g., the electrostatic charging. This also applies to the process described in U.S. Pat. No. 3,284,253 for the preparation of nitrocellulose moistened with a liquid hydrocarbon, the removal of the water also taking place here by azeotropic distillation.

The nitrocelluloses moistened with tert.-butanol which are prepared according to the application EP-A-0 172 482 can easily be prepared by the customary displacement processes. However, this process has the disadvantage that the amount of tertiary alcohols needed to displace the water is high if a water content of less than 0.1 wt. % is required.

Nitrocelluloses plasticized with plasticizers are used for polyurethane lacquers. Dibutyl phthalate or dioctyl phthalate, e.g., are used as such plasticizers. Such low molecular weight plasticizers containing no hydroxyl groups significantly reduce the quality of the lacquer layer. According to the prior art, incorporation of plasticizers containing hydroxyl groups can generally be realized industrially only with a considerable increased expenditure, such as e.g. using additional solvents, which later have to be removed by distillation.

The water-soluble emulsifiers and protective colloids used according to DE-A-25 29 547 significantly reduce the lacquer qualities in the concentrations stated, since they are incompatible with these nitrocellulose-polymer combinations. This incompatibility leads to clouding in the lacquer film and reduces the resistance to water.

The object of the invention was to provide such cellulose ester-polymer combinations which do not have the known disadvantages and as far as possible are already obtained during their preparation as dispersion particles which are capable of sedimentation.

The invention relates to cellulose ester-polymer combinations containing at least one cellulose ester A and at least one polymerized monomer B, characterized in that the monomer B corresponds to the following formula

in which
R$^1$ denotes a hydrogen atom or a methyl group and
R$^2$ denotes a hydrogen, an alkyl radical with 1–20 carbon atoms, a cycloalkyl radical with 5 or 6 carbon atoms, —(CH$_2$—CH$_2$—O)$_n$—R$^3$, (where R$^3$ is H, CH$_3$ or C$_2$H$_5$ and n=2–50), —C$_6$H$_5$ or —CH$_2$C$_6$H$_5$, and wherein the particles of the combination are essentially 0.1 to 10 mm in size.

In a preferred embodiment, the weight content of the hydroxyl groups of A and B, based on the total solids content, is between 0.1 and 9 wt. %, in particular between 1 and 6 wt. %. In another preferred embodiment, the abovementioned particle size is 0.5 to 5 mm. The proportion of low molecular weight compounds is preferably less than 0.3 wt. %, based on the combination. Low molecular weight compounds is understood as meaning compounds with a molecular weight <300, in particular alcohols from the moistened nitrocellulose, residual monomers and water.

In a particularly preferred embodiment, the combination contains a water-insoluble dispersing auxiliary D, preferably in a concentration of not more than 2 wt. %, preferably 0.05 to 0.5 wt. %, based on all the solids in the combination according to the invention.

The invention furthermore relates to a process for the preparation of the cellulose ester-polymer combinations according to the invention, characterized in that at least one cellulose ester A and at least one monomer B are dispersed and polymerized in an aqueous medium, characterized in that the monomer B corresponds to the following formula

in which
R$^1$ denotes a hydrogen atom or a methyl group and
R$^2$ denotes a hydrogen, an alkyl radical with 1–20 carbon atoms, a cycloalkyl radical with 5 or 6 carbon atoms, —(CH$_2$—CH$_2$—O)$_n$—R$^3$, (where R$^3$ is H, CH$_3$ or C$_2$H$_5$ and n=2–50), —C$_6$H$_5$ or —CH$_2$C$_6$H$_5$, and wherein the particles of the combination are essentially 0.1 to 10 mm in size.

The invention furthermore relates to a process for the preparation of a lacquer, characterized in that a cellulose ester-polymer combination according to the invention is used.

Preferred suitable cellulose esters A are cellulose nitrates of all viscosity levels. Cellulose nitrates in the customary lacquer qualities, i.e. with a nitrogen content of 10.0–12.6 wt. %, are especially suitable. However, it is entirely conceivable to use other cellulose esters, such as e.g. cellulose acetobutyrate or cellulose acetate.

Suitable polymerizable monomers B or monomer mixtures are those which have dissolving properties towards cellulose nitrate, in particular butyl acrylate, methyl methacrylate, butyl methacrylate and methyl acrylate.

Other polymerized monomers C can additionally be employed according to the invention. The polymers C according to the invention are preferably employed in an amount of 2 to 80 wt. %, based on the total weight of the monomers B, in particular 5 to 50 wt. %, based on the total weight of B.

Particularly preferred monomers C of this type are listed below:

C1. Styrene and substituted styrenes of the following general formula II

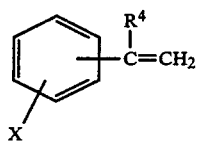

wherein
R$^4$ denotes an H— or —CH$_3$ and X denotes a hydrogen or halogen atom (e.g. a chlorine or bromine atom) or a methyl group.

C2. Vinyl esters, such as vinyl acetate and vinyl propionate and butyrate. Vinyl acetate is preferred.

C3. Vinyl chloride and vinylidene chloride.

C4. A monomer of the following general formula

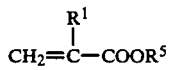

in which
R$^1$ can be H or CH$_3$ and
R$^5$ represents an alkyl group with 1-6 C atoms, which contains at least one OH group.

C5. Acrylonitrile or methacrylonitrile can also be present.

C6. Reaction products of hydroxyethyl acrylate, hydroxypropyl acrylate, hydroxypropyl methacrylate or hydroxyethyl methacrylate and monoisocyanates or epoxides.

C7. Allyl ethers, such as e.g. trimethylolpropane monoallyl ether.

Compounds E which contain more than one double bond per molecule, such as e.g. epoxypolyacrylates, polyester-polyacrylates, polyurethanepolyacrylates or the corresponding methacrylates or polyallyl ether compounds, can additionally be used in an amount of not more than 10 wt. %, based on the total monomers employed.

It is further more also possible for resins or those plasticizers which contain at least 2 hydroxyl groups per molecule to be admixed to the monomer solution according to the invention. Those compounds which reduce the combustibility of the cellulose ester-polymer combination can also be added.

The cellulose-polymer combination according to the invention is prepared by polymerization of an emulsified cellulose ester-monomer mixture in an aqueous medium and subsequent separation off of the solid, with any necessary drying. The combination according to the invention preferably contains, based on the total solids content, 2-82, in particular 10-70 parts by wt. cellulose ester A and 18-98, in particular 30-90 parts by wt. polymerized B.

Processes for the preparation of the aqueous emulsion are generally known and are described, e.g., in chapter 6 of the book by Paul Becker "Emulsions: Theory and Practice", Reinhold Publishing Corp., New York, 1965. The emulsification can be carried out by simple stirring of all the constituents of the reaction mixture in the reaction vessel, or by preliminary dissolving of the polymer in the monomers and subsequent emulsification of this solution in water. The emulsification can moreover be carried out with the aid of the ultrasonic mixing method or the nozzle mixing method, by using mixers and by combinations of these methods. In a preferred embodiment, the cellulose ester is dissolved in the monomer or the monomer mixture and this solution is taken as the initial mixture.

The time required for preliminary dissolving of the cellulose esters in the monomers depends greatly on the solubility of the cellulose ester in the monomers, on the molecular weight of the cellulose ester and on the proportions. It can vary between a few minutes and several days, and mixtures with dissolving times of 10 minutes to 5 hours are preferred.

The temperature can be constant or varied during the emulsification. It can be in the range from 0° to 110° C., in the case of preliminary dissolving of the celluose esters in the monomers up to 150° C., and temperatures of 20° to 100° C. are preferred.

The emulsification can take place in any desired vessel, but preferably in the reactor used for the polymerization. The system can be open (normal pressure) or closed. Pressure containers (autoclaves) are preferred. The pressure conditions during the emulsification depend on the vapour pressure of the monomers and other additives and on the temperature used.

The aqueous cellulose ester-monomer emulsion is converted into an aqueous polymer dispersion by free radical polymerization. The dispersion particles preferably contain the cellulose ester A and the polymerized monomer B, the build-up of each dispersion particle as a rule being homogeneous.

The polymerization preferably takes place in the same vessel in which the aqueous emulsion has been prepared. Pressure systems (autoclaves) are particularly preferred. Depending on the nature of the constituents of the batch, the polymerization takes place under normal pressure or increased pressure. It has also proved appropriate to cover the reaction mixture with a layer of an inert gas.

The polymerization can be carried out continuously, discontinuously or by the cascade principle. The reaction requires an initiator which forms free radicals, which is added all at once, in portions or continuously. The addition can be made in bulk or in solution. Addition of the initiator to the monomer mixture is preferred.

As well as individual initiators, mixtures of several initiators can also be employed. Mixtures of initiators of different rates of dissociation are preferred.

The polymerization temperature is preferably in the range from 0° to 120° C., preferably from room temperature to 80° C. The polymerization time can be a few minutes to several hours, and is preferably in the range from 1 to 8 hours.

Oil-soluble compounds which form free radicals are particularly suitable initiators.

Examples of oil-soluble compounds which can be employed are organic peroxides and hydroperoxides, such as benzoyl peroxide, lauryl peroxide and cyclohexanone hydroperoxide, percarbonates, such as myristyl percarbonate, and azo compounds, such as azobisisobutyronitrile.

The amounts of initiators used are preferably in the range from 0.1 to 10 wt. %, preferably from 0.5 to 5 wt. %, based on the sum of the polymerizable compounds. The molecular weights can be limited in the customary manner by addition of chain transfer agents and regulators.

Examples of chain transfer agents which can be employed are bis(isopropylxanthyl) disulphide, mercaptoethanol or mercaptopropionic acid.

The cellulose ester-polymer particles according to the invention can be isolated by known processes, e.g., by centrifugation, sieving, spray drying, freeze drying or fluidized bed drying. The drying can be carried out under normal pressure or in vacuo. Pressures of 1 to 50 mbar are preferred. The drying temperatures should not exceed 120° C., and temperatures between 40° and 80° C. are preferred. During the drying additives such as surfactants, accelerators for drying and flame retarding agents may be added.

Suitable water-insoluble dispersing auxiliaries D are nonionic substances.

Examples of nonionic substances D are ethoxylated mono- and polyhydric alcohols (i.e., the ethylene oxide derivatives of these alcohols), ethylene oxide/propylene oxide block copolymers, esters (e.g., glyceryl monostearate), ethoxylated oils, such as, e.g., ethoxylation products of castor or soya oil, dehydration products of sorbitol, e.g., sorbitan monostearate and polyethylene oxide sorbitan monolaurate, as well as lauric acid isopropanolamide.

The water insolubility is as a rule achieved by low degrees of ethoxylation. Water-insoluble cellulose derivatives, such as e.g. ethyl- or propylcellulose, and synthetic resins can likewise be employed.

It is likewise possible to employ water-soluble emulsifiers if their use concentration is less than 0.1 wt. %. Mixture of the compounds listed above can also be employed. Higher concentrations of water-soluble emulsifiers lead to small particles which are difficult to isolate. The use of larger amounts of water-soluble emulsifiers moreover results in lacquer films which are not free from clouding, and the resistance to water is reduced.

The cellulose ester-polymer combinations according to the invention are distinguished by a narrow particle size distribution and excellent free-flowing properties. It is remarkable here that generally no fine dust is formed and there is thus a significantly reduced hazard potential (hardly any electrostatic charging) in comparison with the known products containing cellulose esters.

Because of the excellent free-flowing properties and the absence of volatile constituents, the user has the possibility of withdrawing part amounts and of metering.

The cellulose ester-polymer combinations according to the invention are generally clearly and readily soluble in the solvents or mixtures known for cellulose ester binders, in particular in esters and ketones.

The viscosity of a 30% solution of the cellulose ester-polymer combination in ethyl acetate is preferably in the range from 100 to 5,000 mPa.s, preferably in the range from 200 to 1,000 mPa.s.

The cellulose ester-polymer combinations according to the invention can also be combined with other lacquer binders or lacquer additives and are suitable for lacquers for various fields of use, depending on the composition of the cellulose ester-polymer combination, such as, e.g., for wood, metal, plastic, paper, films, leather, magnetic data carriers or mineral priming lacquers, it being possible for the lacquer binders to be combined with isocyanate-containing compounds, if necessary, in order to improve the quality.

There is extensive literature on possible combination partners for cellulose ester binders. An example which may be mentioned is: "Karsten, Lackrohstofftabellen (Karsten Lacquer Raw Material Tables)", 8th edition, Curt R. Vincentz Verlag, Hannover, 1987.

Transparent or pigmented lacquers can be prepared.

EXAMPLES

In the examples, the viscosity is measured in all cases under the following conditions:

The viscosity of the 30 wt. % solution of the combination according to the invention in ethyl acetate is measured in a Rotovisko (Haake) under the following conditions:
Speed of rotation: 2.83 rpm
Shaped article: MV2
Temperature: 20° C.

The volatile constituents are determined by means of gas chromatography (residual monomers and residual transfer agent) and Karl Fischer titration (water).

EXAMPLE 1

A solution of 2.7 g hydroxypropyl methacrylate, 6.15 g azobisisobutyronitrile (AIBN), 0.56 g 2-mercaptoethanol and 2.7 g ethoxylated nonylphenol, about 43% ethylene oxide (Antarox® CO-430), in 117.6 g butyl acrylate is added to 184.6 g water-moist nitrocellulose standard grade E 34 (12.0% N) (contains 120 g dry nitrocellulose) in a 1 l glass reactor. The mixture is converted into a high-viscosity water-in-oil emulsion by stirring for 30 minutes with an anchor stirrer (100 rpm). During the homogenization phase, the atmospheric oxygen is displaced by nitrogen.

A solution of 0.5 g NaHCO$_3$ in 494 g deionized water is metered in over a period of 1 h. 30 min after the start of metering, the stirrer speed is increased from 100 to 300 rpm. After stirring for a further hour, the stirrer speed is reduced to 200 rpm and the contents of the reactor are heated up to a reaction temperature of 60° C. The reaction has ended after 4 h at 60° C.

The polymer is filtered off with suction and dried in vacuo (20 mbar) at 50° C.

The yield achieved is 100%.
Average particle diameter: 1.05 mm
Volatile constituents: 0.18%
Hydroxy group content: 2.55%

EXAMPLE 2

A solution of 1.2 g ethylcellulose (N 7), 1.9 g bis(isopropylxanthyl) disulphide and 6.15 g AIBN in 120 g butyl acrylate is added to 184.6 g water-moist nitrocellulose (contains 120 g dry nitrocellulose), standard grade E 34 (12.2% N). The mixture is homogenized as described in example 1 and emulsified by addition of 494 g 0.1% NaHCO$_3$ solution. The reaction temperature is increased to 80° C.
Yield: 100%
Viscosity: 330 mPa.s
Average particle diameter: 0.95 mm
Hydroxyl group content: 2.1%

Volatile constituents: 0.14%

EXAMPLE 3

120 g butyl acrylate, 0.48 g bis(isopropylxanthyl) disulphide and 3.1 g AIBN are added to 184.6 g water-moist nitrocellulose (contains 120 g dry nitrocellulose), standard grade E 34 (11.8% N). The mixture is homogenized as described in example 1 and covered with a layer of nitrogen. An oil-in-water emulsion is then prepared by slowly adding a solution of 100 mg sodium dodecylbenzenesulphonate, 50 mg alkylphenoxypoly(ethylenoxy)ethyl ester of phosphoric acid (Gafac ® RE 610) and 5.3 g NaHCO$_3$ in 890 ml deionized water, while stirring (300 rpm).

The polymerization takes place at 60° C. in the course of 6 hours.
Yield: 94%
Viscosity: 450 mPa.s
Average particle diameter: 0.34 mm
Hydroxyl group content: 2.6%
Volatile constituents: 0.17%

EXAMPLE 4

The dispersion was prepared as described in example 1, but 20 wt. % of the butyl acrylate was replaced by acrylonitrile and the amount of 2-mercaptoethanol was increased to 1.1 g.
Yield: 96.6%
Viscosity: 1900 mPa.s
Average particle diameter: 1.16 mm
Hydroxyl group content: 2.6%
Volatile constituents: 0.24%

EXAMPLE 5

A solution of 2.4 g bis(isopropylxanthyl) disulphide, 11.1 g AIBN and 1.8 g ethylcellulose (N 7) in 144 g butyl acrylate is added to 332.3 g water-moist nitrocellulose standard type E 34, 12.0% N (contains 216 g dry nitrocellulose). The mixture is homogenized, and emulsified by addition of a solution of 0.75 g NaHCO$_3$ in 1,440 ml deionized water. The polymerization is carried out at 60° C. in the course of 6 hours.
Yield: 98%
Viscosity: 680 mPa.s
Average particle diameter: 1.20 mm
Hydroxyl group content: 2.9%
Volatile constituents: 0.21%

EXAMPLE 6

0.48 g bis(isopropylxanthyl) disulphide, 6.2 g AIBN, 12 g hydroxypropyl methacrylate and 108 g butyl acrylate are added to 184.6 g water-moist nitrocellulose standard type A 27, 11.0% N (contains 120 g dry nitrocellulose). After homogenization and emulsification with a solution of 0.5 g NaHCO$_3$, 100 mg sodium dodecylbenzenesulphonate and 50 mg alkylphenoxypoly(ethylenoxy)ethyl ester of phosphoric acid (Gafac ® RE 610) in 720 ml deionized water, the emulsion is heated at 60° C. for 4 hours.
Yield: 98.5%
Viscosity: 560 mPa.s
Average particle diameter: 0.28 mm
Hydroxyl group content: 3.5%
Volatile constituents: 0.23%

EXAMPLE 7

120 g cellulose acetate (Cellidor ® A, Bayer AG), 0.48 g bis(isopropylxanthyl) disulphide and 3.1 g AIBN are dissolved in a mixture of 120 g butyl acrylate, 20 g methyl methacrylate and 4 g hydroxypropyl methacrylate. This solution is saturated with nitrogen, while stirring (250 rpm), and converted into a emulsion by slowly adding a solution of 120 mg sodium dodecylbenzenesulphonate, 60 mg Gafac ® RE 610 and 6.3 g NaHCO$_3$ in 750 ml deionized water. The emulsion is then polymerized at 70° C. for 4 h. The product is isolated by filtration with suction and drying (60° C., 20 mbar).
Yield: 98%
Viscosity: 280 mPa.s
Average particle diameter: 0.45 mm
Hydroxyl group content: 3.4%
Volatile constituents: 0.21%

EXAMPLE 8

120 g cellulose acetobutyrate (Cellidor ®, Bayer AG), 0.48 g bis(isopropylxanthyl) disulphide and 4.7 g AIBN are dissolved in a mixture of 50 g butyl acrylate, 50 g butyl methacrylate, 20 g hydroxypropyl methacrylate and 2,7 g ethoxylated nonylphenol, about 43% EO (Antarox ® CO-430). After addition of 750 ml deionized water, the mixture is saturated with nitrogen and emulsified, while stirring (200 rpm).

The polymerization takes place at 70° C. in the course of 4 h.
Yield: 97%
Viscosity: 320 mPa.s
Average particle diameter: 1.4 mm
Hydroxyl group content: 1.2%
Volatile constituents: 0.24%

For technological testing, the products of examples 1-8 are dissolved to 30% in ethyl acetate/xylene=1:1. Wet films of these solutions 180 μm thick are drawn onto glass plates and dried. After 24 hours, the pendulum hardnesses (according to König) are measured at 20° C. The appearance of the films is evaluated visually.

| Example | Pendulum hardness (according to Konig) | Appearance of the films |
|---|---|---|
| 1 | 172 s | clear, free from specks |
| 2 | 165 s | clear, free from specks |
| 3 | 162 s | clear, free from specks |
| 4 | 155 s | clear, free from specks |
| 5 | 178 s | clear, free from specks |
| 6 | 145 s | clear, free from specks |
| 7 | 184 s | clear, free from specks |
| 8 | 178 s | clear, free from specks |

We claim:
1. Dry free-flowing cellulose ester-polymer particles consisting essentially of cellulose ester A, polymer B, and a water-insoluble nonionic dispersing agent, free of volatile constituents, the particles being 0.1 to 10 mm in size, the polymer B being formed of monomer of the formula

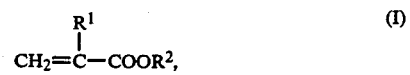

$$CH_2=\underset{\underset{R^1}{|}}{C}-COOR^2, \quad (I)$$

in which
R$^1$ denotes a hydrogen atom or a methyl group and R$^2$ denotes a hydrogen, an alkyl radical with 1–20 carbon atoms, a cycloalkyl radical with 5 or 6 carbon atoms, —(CH$_2$—CH$_2$—O)$_n$—R$^3$ (where R$^3$ is H, $CH_3$ or $C_2H_5$ and n=2–50), $-C_6H_5$ or $-CH_2C_6H_5$.

2. Dry free-flowing cellulose ester-polymer particles according to claim 1, wherein the water-insoluble dispersing agent is present in no more than 2% by weight.

3. Dry free-flowing cellulose ester-polymer particles according to claim 1, wherein the cellulose ester A is a cellulose nitrate.

4. Dry free-flowing cellulose ester-polymer particles according to claim 1, wherein cellulose ester A and polymer B have hydroxyl groups and the weight content of the hydroxyl groups of A and B is between 0.1 and 9 wt. %, based on the total solids content.

5. Dry free-flowing cellulose ester-polymer particles according to claim 1, wherein cellulose ester A and polymer B have hydroxyl groups and the weight content of the hydroxyl groups of A and B is between 1 to 6 wt. %, based on the total solids content.

6. Dry free-flowing cellulose ester-polymer particles according to claim 1, wherein the particles are 0.5 to 5 mm in size.

7. Dry free-flowing cellulose ester-polymer particles according to claim 1, wherein the water-insoluble dispersing agent is present in 0.05 to 0.5% by weight.

8. Dry free-flowing cellulose ester-polymer particles according to claim 1, the particles further containing an additional plymer C present in 2 to 80 weight % based on polymer B.

9. Dry free-flowing cellulose ester-polymer particles aaccording to claim 8, wherein polymer C is a polymer of (a) a styrene or substituted styrene of the formula

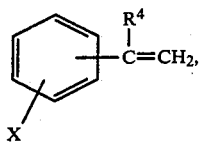

wherein
$R^4$ is an H— or $CH_3$ and X is hydrogen, a halogen or a methyl group,
(b) a vinyl ester,
(c) a vinyl chloride or a vinylidine chloride,
(d) a monomer of the formula

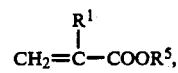

wherein
$R^6$ is H or $CH_3$ and
$R^5$ is a $C_1$-$C_6$ alkyl which contains at least one OH group,
(e) acrylonitrile or methacrylonitrile,
(f) the reaction product of hydroxyethyl acrylate, hydroxylpropyl acrylate, hydroxylpropyl methacrylate or hydroxyethyl methacrylate and a monoisocyanate epoxide or
(g) an allyl ester.

10. Dry free-flowing cellulose ester-polymer particles according to claim 1, wherein the nonionic dispersing agent is an ethoxylated mono- or polyhydric alcohol, an ethylene oxide/propylene oxide block copolymer, an ester, an ethoxylated oil, a dehydration product of sorbitol, or aluric acid isopropanolamide.

11. Dry free-flowing cellulose ester-polymer particles aaccording to claim 1, wherein the nonionic dispersing agent is glyceryl monostearate, an ethoxylation product of castor oil or soya oil, sorbitan monosterate or polyethylene oxide sorbitan monolaurate.

12. A lacquer formed from dry free-flowing cellulose ester-polymer particles according to claim 1.

* * * * *

UNITED STATES PATENT AND TRADEMARK OFFICE
CERTIFICATE OF CORRECTION

PATENT NO. : 5,011,874

DATED : April 30, 1991

INVENTOR(S) : Lutz Hoppe, et al

It is certified that error appears in the above-identified patent and that said Letters Patent is hereby corrected as shown below:

Col. 10, line 17    Delete " $CH_2=\overset{\overset{R^1}{|}}{C}-COOR^5$ " and substitute -- $CH_2=\overset{\overset{R^6}{|}}{C}-COOR^5$ --

Signed and Sealed this

Eleventh Day of May, 1993

*Attest:*

MICHAEL K. KIRK

*Attesting Officer*    *Acting Commissioner of Patents and Trademarks*